Feb. 2, 1971 — J. L. MISSIOUX — 3,560,302
SHAPING DRUM FOR THE MANUFACTURE OF TIRE CASINGS
Filed Oct. 18, 1967 — 5 Sheets-Sheet 1
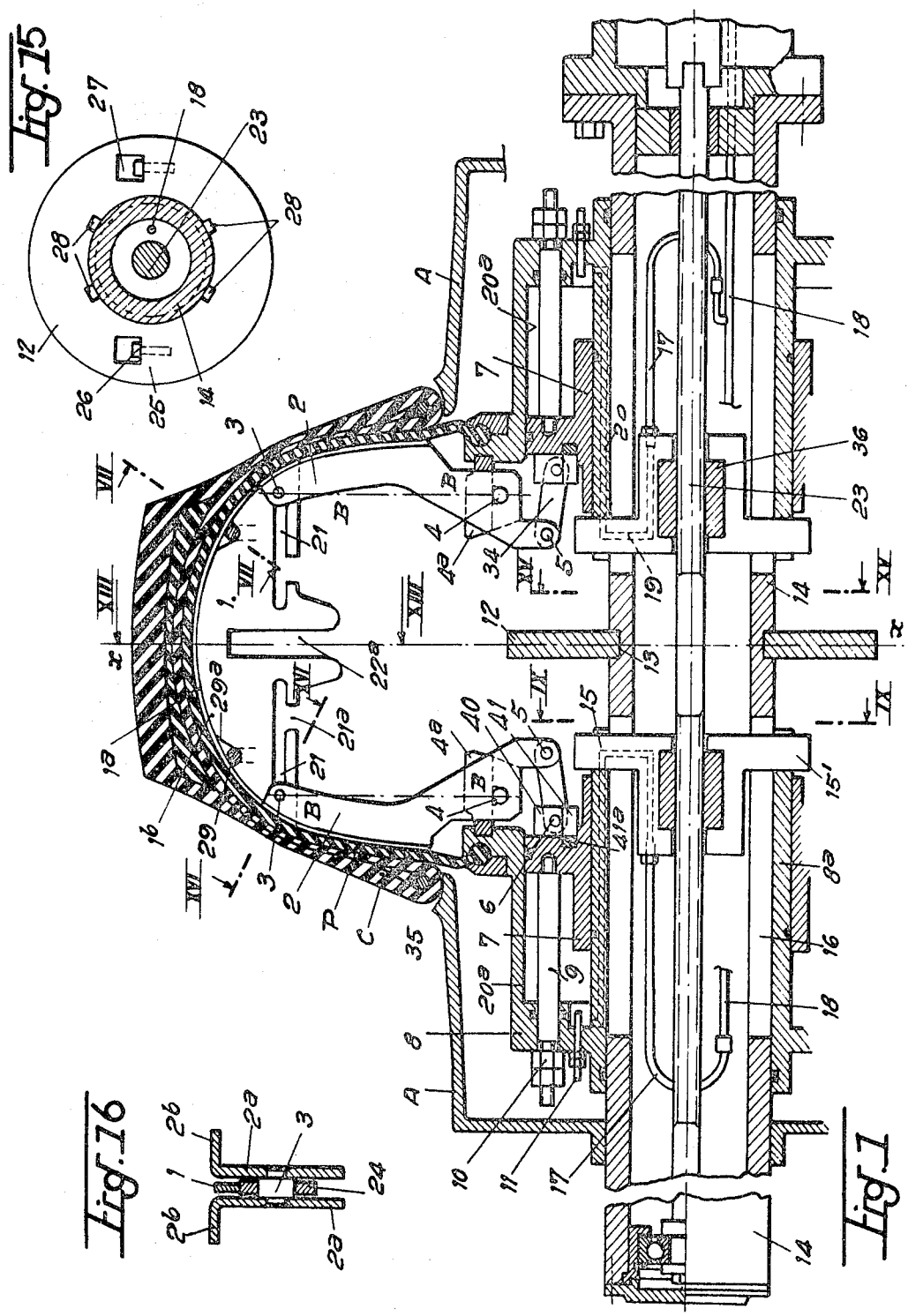
INVENTOR
JEAN LÉON MISSIOUX
BY
Woodhams, Blanchard & Flynn
ATTORNEYS

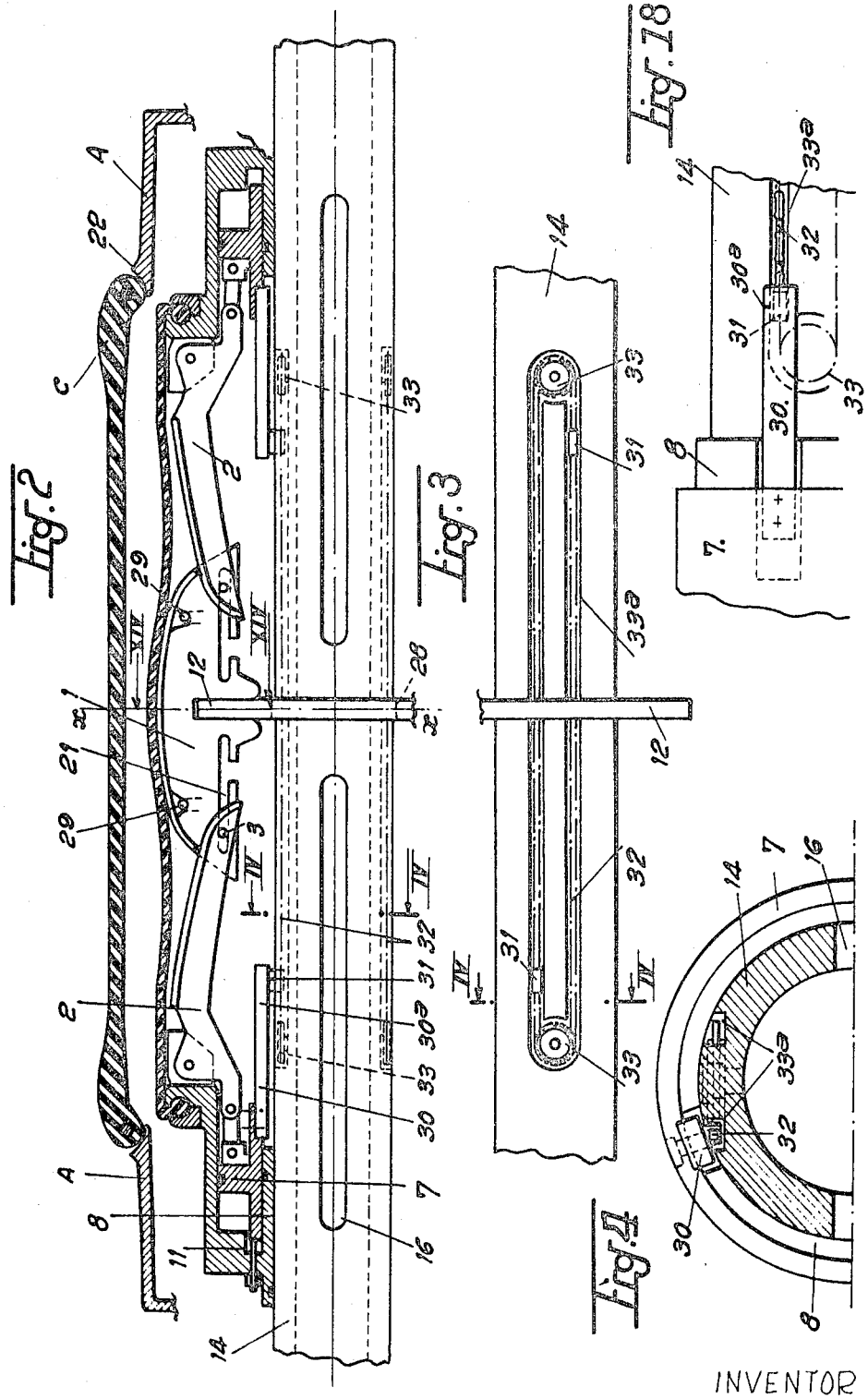

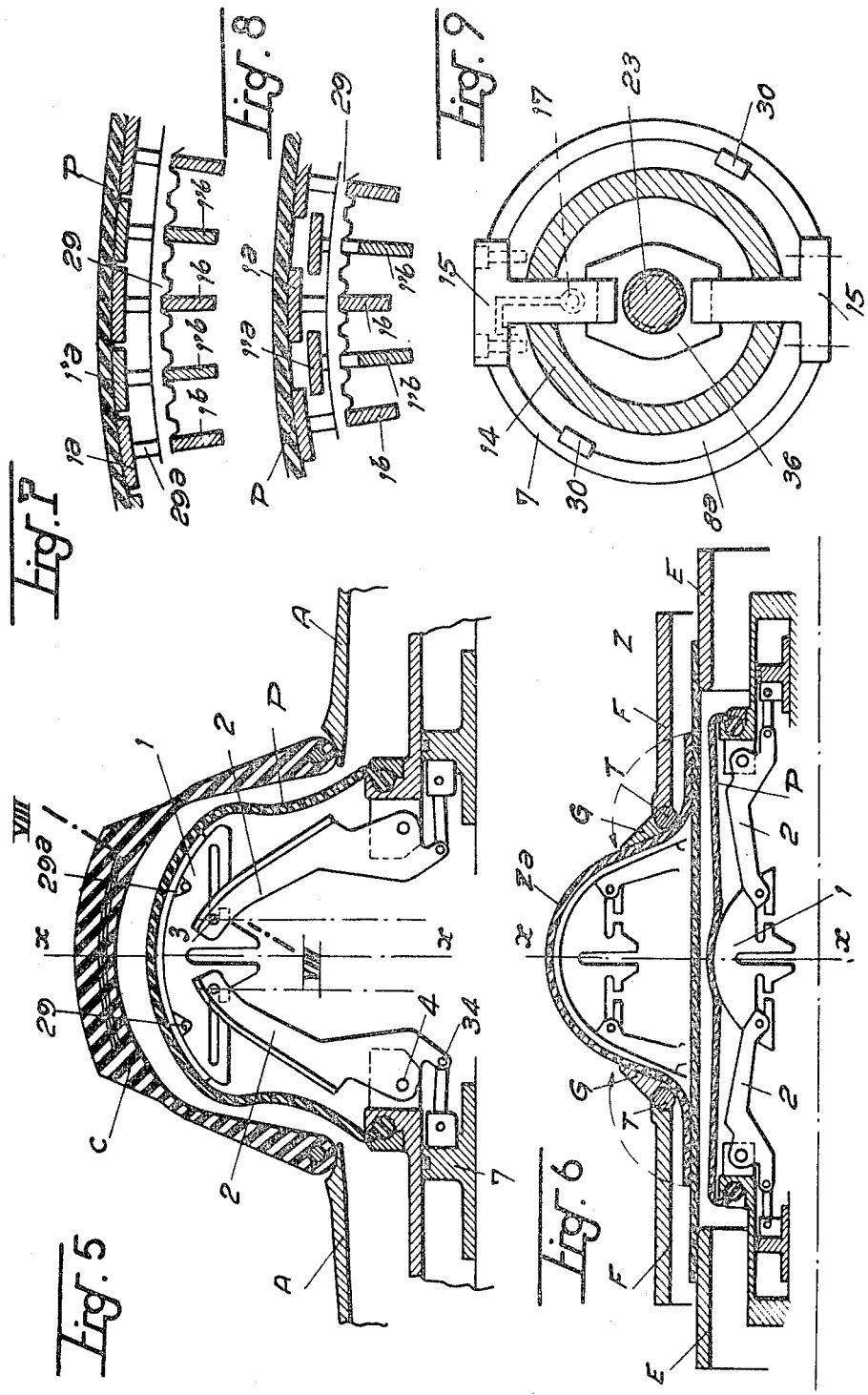

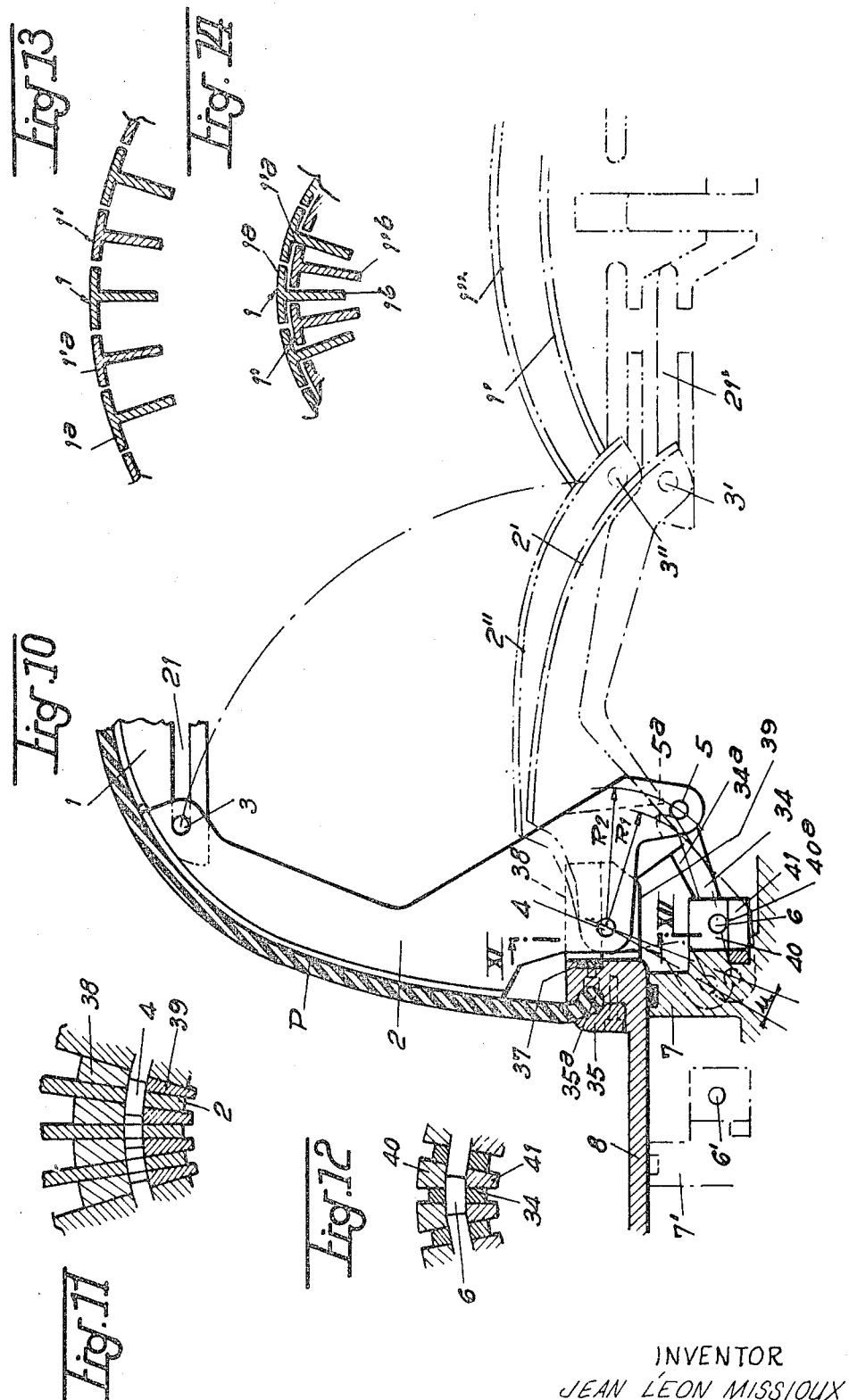

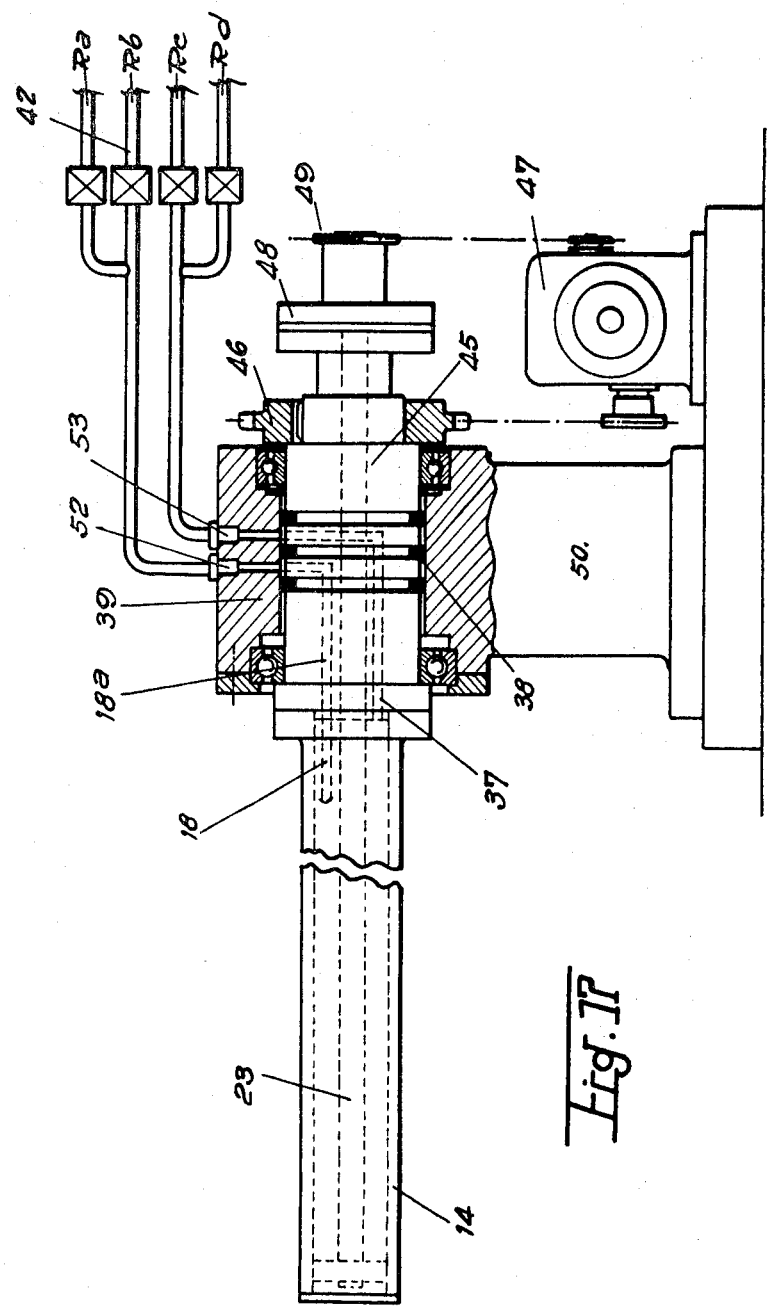

3,560,302
SHAPING DRUM FOR THE MANUFACTURE OF
TIRE CASINGS
Jean Léon Missioux, 55 Boulevard Gambetta,
Sannois, Val d'Oise, France
Filed Oct. 18, 1967, Ser. No. 676,344
Claims priority, application France, Nov. 15, 1966,
83,735
Int. Cl. B29h 17/26
U.S. Cl. 156—415                                         7 Claims

ABSTRACT OF THE DISCLOSURE

A machine for shaping a tire casing first in a rough form and then in a finished form. The shaping surface is defined by plural groups of three elements pivotally connected together and pivotally mounted for movement between expanded and retracted positions. In the expanded positions, the groups of elements define an annular surface for supporting a resiliently flexible cover which engages and forms the inner surface of the casing.

---

The present invention relates to an expensible drum for shaping the central portions of a partly fabricated casing, and for assembling with such casing certain peripheral elements, such as reinforcing bands and the tread. This drum is capable of shaping an external surface of revolution by means of rigid and closely adjacent elements which are hingedly connected and give the expansible casing a form strictly and geometrically defined to receive the peripheral elements with a great precision.

The shaping drum of the invention can gradually form roughly shaped, nearly cylindrical casings furnished with their reinforcing rods and containing only one or several plies, which are expanded in their central part without being connected to the rods. In this case, the rods and the associated flanged edges of the casing are put in place at the end of the forming operation by applying the opposing, lateral rigid walls of the drum against these parts.

The peripheral portion of the drum is comprised of plural, closely spaced groups of three rigid elements arranged to define an annular, external surface. Each group of elements consists of a central element and two lateral or side elements, and the groups are distributed uniformly around a common axis of revolution. The elements in each group are capable of being displaced radially. The groups of elements constitute a nearly continuous rigid surface while the drum is at its maximum diameter. This surface, which is arcuate both axially and circumferentially, is covered with an elastic skin arranged to extend between the elements, to maintain their uniform separation, to increase their resistance to tangential, exterior urging and to provide a radially inward force when the drum is returned to its flat or retracted condition, prior to the removal of the fabricated casing. This elastic skin is secured along its edges to metallic rings sliding symmetrically along the shaft of the drum. These rings are furnished with flange means to pivotally support the lateral elements constituting the walls or the sides of the drum which engage the tire casing.

One of the advantageous characteristics of the invention is that in each group of three elements, the central element has a curved form along its radially outer edge whose axis of symmetry is in the central plane of the casing or the drum. The central element is moved and guided radially by the extremities of the two associated lateral elements which are pivotally mounted upon the holding rings for the elastic skin.

At the end of the shaping, the central elements constitute the surface of support of the peripheral band and the tread of the casing while the exterior parts of the lateral elements constitute the surface of support of the reinforcing rods and of the sides of the casing.

Another advantageous characteristic of the invention is that the central elements are furnished with three slots, two of the slots being of somewhat symmetrical form with respect to the radial axis of the drum, and a radial slot along this axis and opening toward the interior of the central element. An important point is that the two symmetrical slots each open inwardly toward the axis of the drum, thereby allowing for easy removal of the central elements with the object of replacing them rapidly by central elements of another form. By this means, it is possible to manufacture casings of different dimensions in size and in diameter by changing only the central elements and regulating the spacing of the side elements.

Another advantageous characteristic of the invention is that each central element is guided by two rollers carried respectively by the extremities of each of the associated lateral elements. These rollers are disposed in the symmetrical slots of the central element, and they are located at the remote extremities of these slots furthest from the axis of symmetry of the central element when the expansion of the drum is maximum in the course of shaping the casing.

In order to accomplish the return of the elements for the purpose of removing the shaped casing, the lateral elements are pivoted uniformly toward the central plane of the drum until their rollers almost abut the adjacent ends of the symmetrical slots in the central element, situated near the central plane of the drum. This pivoting removes the parts of the central elements near the reinforcing rods and the sides of the shaped casing, that which later results in the movement of separation of the sliding rings to which the side elements are attached, without interfering with the flanges of the shaped casing. This method of return is an important point of the invention.

Another characteristic of the invention is constituted by the radial slots in the central elements into which is received the edge of a thin disk which is mounted on the drum shaft in the central plane of the drum, so that the axis of revolution of the disk coincides with that of the drum. The thickness of the disk is equal to the width of the radial slots in the central elements and thereby assures accurate and simultaneous guiding of all of the central elements during the first part of the shaping. That permits a precise positioning of the interior wall of the casing to be shaped, with respect to the central part of the drum, without the lateral elements being required to provide for the symmetry. The action of these side or lateral elements is, in this stage of the shaping, limited to an action of radial expansion.

Another characteristic of the invention is that the central elements as well as the lateral elements can be furnished with grooves or slots receiving one or several elastic rings mounted under tension and whose axes coincide substantially with the axis of revolution of the drum. These elastic rings can be advantageously furnished with radially inwardly extending and uniformly spaced projections between which are placed the central or lateral elements, so that these elements are maintained substantially equidistant from each other while the expansion or retraction of the drum is accomplished. These elastic rings also provide a force urging the elements radially into their retracted positions.

A feature of the invention is to maintain the symmetry of the lateral elements mounted on the sliding rings during their pivotal movements by means of symmetrical nuts moved by a screw with cooperating threads. Moreover, the sliding rings, which assure the pivoting of the lateral elements, are connected for symmetrical movement to at least one or more chains encircling two gears whose axes are perpendicular to the axis of revolution of the drum. The same symmetry of movement can be obtained by means of at least two gear racks arranged parallel with the axis of revolution of the drum and both engaged by at least one pinion whose axis is perpendicular to the axis of revolution of the drum. This alternative arrangement of gear racks of symmetry can be substituted for the arrangement of chains located in the available positions around the drum shaft.

One of the important features of this drum is its ability to provide a nearly continuous surface of revolution defined by rigid and movable elements which become almost contiguous when the drum is in its extended position. To obtain this effect, the group of three elements mentioned above undergo radial displacement of different amplitudes between the retracted or flat position and at the expanded position during the shaping operation.

The rigid elements in even number are each comprised of a relatively thin external part stiffened by a plate or flange preferably located within a radial plane including the axis of revolution of the drum. The side elements are also preferably comprised of two different sizes arranged alternately around the drum. While the drum is at its smallest diameter, the side elements of the one type have their external edges adjacent to each other, and the elements of the other type are nested beneath the elements of the one type, due to their greater radial extent. When the drum has attained its greatest diameter, the elements of greater length move into position between the edges of the elements of lesser length, and thereby occupy the space that is created between the longer elements as the result of the expansion of the drum during the outward movement of such elements.

These relative movements are easily obtained by means of the two symmetrical sliding rings carrying the connecting links which are pivotally connected to each lateral element of the drum and to said rings.

These connecting links are of different lengths accordingly as they are attached to an element of one length or of the other length. When the connecting links are displaced symmetrically by a lengthwise movement of the rings along the axis of the drum, the ends of the connecting rings carried by these rings have evidently the same amplitude of displacement. However, the levers to which each of these connecting links are attached, do not pivot through exactly the same angle, depending upon whether they are of the same size or of different size. It is this variation in the angular movement of the lateral elements of the drum which permits them to effect the proper radial displacement of the central elements. This same result can be obtained in attaching the levers to articulated connecting links on different radii.

The following description with reference to the attached drawings is given by way of illustration and is not intended to be limiting; as will be understood as the invention is disclosed, the details of which are clearly evident from the description and from the drawings which constitute a part of the invention.

FIGS. 1 and 2 are partial radial cross sections of the drum showing a group of three elements arranged respectively in their shaping and their flat positions.

FIG. 3 is a partially external view of the drum shaft disclosing one of the chain mechanisms for assuring the symmetry of the limits of displacement of the lateral elements.

FIG. 4 is a substantially cross-sectional view as taken along the line IV—IV normal to the axis of the drum in FIGS. 2 and 3, showing the symmetrical connections with the chains.

FIG. 5 is a radial partial cross section of the drum showing how the groups of the shaping elements are withdrawn from the interior surface of the casing.

FIG. 6 is a radial, partial cross-sectional view of the drum showing, in both the flat and the shaped positions, the distortions that can be created at the bend, and also showing the position of the reinforcing rods and the flanges of the casing during the shaping operation.

FIG. 7 is a partial cross-sectional view of the central elements 1 taken along the line VII—VII in FIG. 1 showing the flexible bands engaging the central elements.

FIG. 8 is a view similar to that of FIG. 7 and taken along the line VIII—VIII in FIG. 5, showing how the central elements are nested with each other during their retraction.

FIG. 9 is a partial cross-sectional view along the line IX—IX in FIG. 1, perpendicular to the axis of the drum and showing the coupling of the external rings with the screw nuts on the central screw.

FIG. 10 is an enlarged fragment of FIG. 1 showing the mechanisms by which the groups of central and lateral elements are displaced radially during their retraction or extension.

FIGS. 11 and 12 are partial cross-sectional views taken along the lines XI—XI and XII—XII, respectively, in FIG. 10 showing the articulations of levers and connecting links.

FIGS. 13 and 14 are partial, cross-sectional views of central elements taken along the cutting lines XIII—XIII and XIV—XIV, respectively, in FIGS. 1 and 2.

FIG. 15 is a cross-sectional view of the drum shaft taken along the line XV—XV in FIG. 1 perpendicular to the axis of the drum shaft and showing the arrangement of the alignment disk.

FIG. 16 is a partial cross-sectional view of one of the lateral elements taken along the line XVI—XVI in FIG. 1.

FIG. 17 is an elevational view in partial cross section showing the principal controls for the rotation of the shaft and of the central screw, and for the distribution of the driving fluids for the drum.

FIG. 18 is a partial exterior view showing one detail of the internal coupling of the rings of the drum to the chains controlling the symmetry of the ring movements.

As shown in FIG. 1, each group of three rigid and interconnected elements includes the central element 1 and the symmetrical side elements 2 which are on opposite sides of the central element.

Element 1 is comprised of a thin radial plate 1b provided at its outer periphery with a thin, broad flange 1a so that this element 1 has a cross section in the form of a T, as FIGS. 13 and 14 show it. The plate 1b has a pair of spaced and symmetrical slots 21 (FIG. 1), which open downwardly at 21a, and the central slot 22a which receives the thin disk 12 between the slots 22. The lateral elements 2 are pivoted around the pins 4 on flanges 4a carried by the annular edges of the cylinders 8. These flanges 4a, as seen in FIGS. 10 and 11, are comprised of the ribs 39 secured to the cylinders 8 and by the ribs 38 carried by the rings 37 attached to the open edges of the cylinders 8. The ribs 38 and the ribs 39 are furnished with cooperating slots in which the pins 4 are held, as is apparent in FIGS. 10 and 11.

Each lateral element 2 is comprised of two symmetrical, thin and rigid plates 2a (FIG. 16) bent to form flanges 2b and having the plate 1b of a central element 1 therebetween. Plates 2a are separated by a shouldered pin 3 riveted to the plates 2a and rotatably supporting a roller 24 which rolls in the slots 21 of the central element 1, which slots are parallel with the axis of the shaft 14.

The lateral elements 2 are pivotally connected near the interior of the drum by pins 5 to the links 34 which are pivotally connected at their other ends to the pins 6 which are held in the recesses 40a in the flanges 40 on the sliding rings 7. The recesses 40a are covered by the solid ribs 41 of a ring 41a fitted into an annular recess in the ring 7 and held by this ring, as shown in FIGS. 1, 10 and 12.

FIG. 10 shows in broken lines how the lateral elements 2 pivot and how these elements are shifted during their pivotal movement. Also, FIG. 10 illustrates two types of lateral elements 2' and 2'', projected together, in order to more easily understand their mutual operation. That is, two adjacent elements 2 are connected, respectively, by a connecting link 34 pivoted at 5 at a distance R2 from the center 4 of articulation, and by a connecting element 34a pivoted at 5a at a distance R1 from the center 4, R1 being smaller than R2 in order to nest the neighboring elements 2' and 2". The two connecting links 34 and 34a are articulated at 5 as the ring 7 is moved from the position 7 to the position 7' away from the center of the drum in a sliding movement along and between the cylindrical walls 8 and 8a defining a chamber 20a in which a partial vacuum is established. This vacuum is obtained by conneciton of chamber 20a to a vacuum pump by the passageways 20 in the inner cylindrical wall or hub 8a (FIG. 1). The passageways 20 communicate by passageways 19 in the end piece 15 with the flexible tubes 17 mounted on the end pieces 15 and joined to the rigid pipes 18 supported on the anterior of the tubular shaft 14 carrying the drum.

When the partial vacuum is established in chamber 20a, the rings 7 are moved lengthwise of the annular chamber 20a, which will make the elements 2 pivot by the action of the connecting elements 34 and 34a. At the end of this outward sliding of the rings 7, the axes 6 of the connecting elements occupy the positions 6' after making the elements 2 pivot inwardly around the axes 4. The displacement angles of adjacent elements 2' and 2" differ by an angle $\mu$ as FIG. 10 shows, due to the different lengths of the connecting elements 34 and 34a and, accordingly, the different pivot points 5 and 5a for the adjacent lateral elements. Thus, the adjacent elements occupy retracted positions 2' and 2" which permit nesting of the adjacent side elements 2 and central elements 1. Thus, the central elements move into the positions 1' and 1" to occupy less space. The relative positions of these central elements 1' and 1" at their inner and outer positions are clearly visible in FIGS. 13 and 14. One sees in FIG. 13 that the elements, which are for the purpose of shaping, will occupy circumferentially aligned positions 1a and 1a' in which the external faces define a single surface of revolution. However, FIG. 14 shows the elements 1 are arranged in such a manner that the elements 1a' are placed under and nested between the elements 1a when they are retracted.

Regulation of the positions of the lateral elements 2 is obtained by two means visible in FIGS. 1, 2 and 15, which are as follows:

The first is constituted by the screw 23 which when rotated symmetrically sets in motion the two nuts 36 retained in the end pieces 15 and held against rotation by engagement with the hubs 8a. The end pieces slide along the shaft 14 and extend through the longitudinal slots 16 in this shaft, as shown in FIGS. 1 and 9. This mechanism permits regulation of the spacing of the axes 4 of articulation of the elements 2 by the position given to the hubs 8a, which are engaged by the pieces 15 and integral with the cylinders 8.

The second is constituted by the threads of the stud 11 carried by the hubs 8a and which limits the sliding movement of the rings 7 in respect to the hubs 8a. Moreover, the rings 7 are connected to solid rods 9 received in openings pierced in the rings 7. These rods 9 have threaded ends engaged by nuts 10 which limit the inward movement of the rings 7 with respect to the hubs 8a when a fluid under pressure is introduced into chamber 20a. The nuts 10 are adjusted in a manner for the purpose of controlling the movement of the rollers 24 carried by the pins 3 on the elements 2 along the slots 21 in the central elements. Otherwise stated, the studs 11 limit the radially inward movement of the elements 2, as can be seen in FIG. 2, while the nuts 10 limit the radially outward movement of these elements.

The skin P (FIG. 1) is comprised of an airtight elastic material, such as India rubber, and is arranged in an annular form which covers the groups of the elements 1 and 2, and is provided along its opposite edges with two circular beads 35a recessed in notches in the edges of the cylinders 8. These beads are held tightly in place by the removable rings 35, which may be connected to the cylinders 8 by screws.

The thin disk 12, which guides part of the radial movement of the central elements 1 (FIG. 2) is in two pieces (FIG. 15) recessed in a slot 13 encircling the arbor 14 (FIG. 1). These two half disks are assembled along a radial plane 25 and held together by the screws 26 shown as disposed in the openings 27 (FIG. 15). The openings 28 receive the reaches of the chain 32 (FIG. 3).

The central elements 1 are further engaged by the elastic rings 29 made, for example, from India rubber and received in the recesses or slots 29a. These rings can advantageously be furnished with enlargements which project inwardly between the plates 1b of the elements 1 and against which these elements bear, as FIG. 7 shows. These elastic rings 29 do not impede the relative movements of the elements 1, as shown in FIG. 8.

The symmetry of the rotations of the side or lateral elements 2 is obtained by the connections of each of the reaches of the chain 32 (FIG. 3) passing around the pinions 33 and moving along the grooves 33a cut into and extending lengthwise of the shaft 14.

For this purpose the rings 7 are connected to the guide bars 30, which extend into a recess in the hubs 8a so as not to impede the relative movement of the rings 7 with respect to the hubs 8a. These guide bars 30 carry at their extremities 30a an element 31 to which are connected the links of the chain 32. These attaching elements 31 assure the connection of the rings 7 to the respective parallel reaches of the chain 32, thus resulting in the symmetrical movement of the rings 7, hence the symmetrical rotation of the elements 2 around their pivot pins 4.

FIG. 17 shows the shaft 14 of the drum connected by a coupling to the shaft 45 of the machine, which is supported by a bearing assembly 39 mounted upon the bearing pedestal 50. The rotation of the shaft 45 is effected by means of a motor 47 which is drivingly connected by a chain to the pinion 46 secured on the shaft 45. The screw 23, disposed within the shaft 14, extends into the interior of the shaft 45 and is connected thereto by a coupling (not shown) and is rotatably driven by a conventional coupling 48, of which a detailed description is not believed necessary. The pinion 46 being held stationary by the stopping of the motor 47, rotation of the screw 23 is effected by operation of the coupling 48, one side of which is connected to an exterior motor transmission by the pinion 49.

When it becomes desirable to produce relative inward movement of the rings 7 within the chamber 20a, one opens a valve $R_a$ which connects a vacuum pump (not shown) to the pipe 18 within the hollow shaft 14. That is, fluid in the pipe 18 is drawn from pipe 18 through pipe 18a in the shaft 45 and then between the sealing elements 38 placed between the shaft 45 and the inner wall of the bearing assembly 39 and through opening 52 in said assembly. In this case, the valve $R_b$ is closed.

Upon closing the Valve $R_a$, after opening the valve $R_b$, it is possible to put the pipe 18 into communication with a source of pressure fluid, such as compressed air, for example, by the tube 42. In this case, a relative separating movement of the rings 7 is effected within the chambers 20a. In the same manner, the valves $R_c$ and $R_d$ effect the introduction of air under pressure into the interior of the drum or withdraw such air by connecting it to a vacuum pump. For this purpose, an opening 53 in the bearing assembly communicates with the opening 37 in the shaft 45 which opens into the tubular shaft 14 of which the air tightness is assured by the elastic skin or membrane P and the seals within the hub 8a sliding along the shaft 14.

FIG. 5 shows the beginning of the reduction in the diameter of the drum and the flattening of the elements 1 and 2 as the result of the evacuation of the curved enclosure. For this purpose, a vacuum is established within the chamber 20a between the rings 7 and the cylinders 8, so as to effect a pivoting of the elements 2 around the pivot pins 4 until the rollers 24 carried by the pins 3 of the side elements 2 abut against the adjacent ends of the slots 21 in the central elements 1. The first movement causes at the same time a reduction in the diameter of the drum by the elements 1 which are thereby moved toward the drum supporting shaft 14 by the combined action of the elements 2 and the contracting forces of the elastic skin P. Then, the cylinders 8 are then separated by turning the screw 23. This movement effects an inward pivoting of the elements 2 toward the interior of the drum, the rollers 24 in the side elements 2 continuing to bear against the adjacent ends of the slots 21 by the resilient action of the skin P, and by coordinated inward movement of the rings 7, which pivot on the links 34, and the cylinders 8, which support the pivot pins of the elements 2. During this movement, the centers of the pins 3 carried by the elements 2 are moved inwardly along the fixed parallel planes A—A on opposite sides of an equidistant from the central planes x—x (FIG. 5). This permits the sliding reception of the disk 12 into the central slots 22a in the central elements 1. While this engagement is being effected, the cylinders 8 are moved away from each other to the end of their stroke by operating the screw 23, so that the elements 2 occupy the positions shown in FIG. 2 where the drum has a minimum diameter. In this position, the rollers 24 carried on the elements 2 by the pins 3 do not abut against the edges of the slots in the elements 1, because these elements are supported in the center by the disk 12.

When, starting from the retracted position of FIG. 2, it becomes desirable to inflate the drum, the cylinders 8 are maintained in a fixed position and compressed air is introduced into the chambers 20a between the cylinders 8 and the hubs 8a, so as to effect an inward movement of the rings 7 which, as a result, effects a rotation of the elements 1 around the pivot pins 4 so that the rollers 24 on the ends of the elements 2 bear against the edges of the slots 21 of the central elements 1. During this part of the movement, the central elements commence to move away from the axis of rotation of the drum and during such movement lose contact with the disk 12 while the rollers 24 bear against the edges of the slots 21. While the force of air pressure is being maintained against the rings 7, the movement of the cylinders 8 toward each other is effected by rotation of the screw 23. In this movement, the rollers 24 carried by the pins 3 on the elements 2 are constantly urged against the remote ends of the slots 21 in the elements 1. Thus, the centers of the pins 3 are disposed in the parallel planes B—B located equidistantly from and on opposite sides of the central plane x—x of the drum, as shown in FIG. 1. Accordingly, the central elements are constantly guided and their axis of symmetry is always in the plane x—x of the drum.

As a result of the reduced radial effect of expansion of the skin P of the drum and of the shaped casing C, due to the positions of the elements 1 and 2 (FIG. 1), it is possible to introduce into the drum a reduced air pressure during the shaping operation.

FIG. 2 shows how a casing C, partly formed and already furnished with its reinforcing rods and flange elements, is mounted on the shaping drum by means of two flanged collars 22 concentric with the shaft 14 and engaging the flanges of the casing C during the first inflation of the drum.

FIG. 6 shows an arrangement designed to shape a preliminary casing from a generally cylindrical preform Z, which is not yet furnished with the reinforcing rods. The edges of this preform are supported by the metal cylindrical sleeves E, which are concentric with the axis of the drum, while the drum commences its shaping expansion. When the central expansion of the drum has attained its maximum, the roughly shaped casing has the form illustrated at $Z_a$. The side elements 2 and central element 1 provide a rigid surface supporting the skin P against which is applied the rough casing $Z_a$. The procedure then continues by placing the annular rods T in positions caried by the rings F which press said rods against the sides of the rough casing $Z_a$ which are backed by the side elements 2. The rods being thus positioned, it is possible to place around them and against the side of the casing the flanged elements G, after which the edges of the casing are folded against and around the rods T. All of these operations can be effected with precision, thanks to the presence of the rigid elements 1 and 2 which provide a continuous surface under the skin P. The shaped casing, furnished with its rods and all other elements, particularly the peripheral elements, is removed from the drum as indicated above.

The embodiments of the invention in which an exclusive property or privilege is claimed are defined as follows:

1. A machine for shaping a tire casing, comprising:
   elongated slide support means comprising a hollow cylindrical shaft;
   first and second pairs of relatively movable slide means supported on said slide support means for movement toward and away from each other and with respect to said slide support means;
   a plurality of rigid elements arranged in groups of three elements defining an annular surface extending substantially concentrically around said elongated slide support means, each group of elements including a pair of similar side elements pivotally supported by said slide means, and a central element pivotally mounted upon and extending between said side elements;
   each pair of slide means comprising a substantially cylindrical member having an annular recess opening toward a central plane perpendicular to said shaft and midway between said slide means, and an annular piston means slideably disposed within recess, said slide elements being pivotally supported upon said cylindrical member and pivotally connected to said piston means;
   actuating means adapted to effect said movement of said slide means with respect to said support means, whereby said elements in each group are simultaneously moved between substantially aligned and retracted positions and extended positions substantially defining a U shape; and
   a resiliently flexible and annular cover means encircling said groups of elements, the opposite axial edges of said cover means being secured to said pairs of said slide means, and the central annular portion of said cover means being positioned closely adjacent to and substantially resting on said central elements when said groups of elements are in the retracted positions whereby movement of said groups of elements to the extended positions by said actuating means causes said central elements to contact the central annular portion of said cover means and expand same radially outwardly into a substantially U shape in partial surrounding relationship to said groups of elements.

2. A machine according to claim 1, wherein said actuating means includes:
   a first actuating mechanism comprising screw means extending through said hollow shaft and having reversed threads on opposite sides of said plane, and a pair of nut means mounted upon said screw means on opposite sides of said plane and connected to said cylinders for effecting relative, similar movement thereof with respect to said central plane in response to rotation of said screw means;
   a second actuating mechanism comprising a pair of elongated elements connected respectively to said piston means and extending lengthwise of said shaft means, said elongated elements being engaged by gear means for effecting simultaneous symmetrical movement of said piston means with respect to said central plane; and passage means connecting said recess to a source of pressure fluid for effecting movement of said piston means toward said central plane.

3. A machine according to claim 1, wherein said shaft includes concentric disk means extending radially therefrom substantially within said central plane; and wherein each of said central elements has an inwardly opening slot into which said disk means is slideably and snugly receivable as said elements approach said retracted position.

4. A machine according to claim 1, wherein said groups of elements are moved from said retracted position toward said extended position by first moving said piston means toward said central plane and with respect to said cylinder means and by thereafter urging said cylinder means uniformly and symmetrically toward said central plane while continuing to urge said piston means toward said plane; and including adjustable stop means mounted upon said cylinder means and said piston means for limiting relative axial movement therebetween.

5. A machine according to claim 1, wherein said side elements are provided in first and second, different lengths, the side elements of the first length being alternated with side elements of the second length circumferentially of said cover means; and wherein the pivotal connections between said first and second side elements and said piston means are of different lengths so that said side elements of the first length are moved through a larger pivotal arc than said side elements of the second length, as they both move between their fully extended positions and their retracted positions, whereby said first and second elements are nested together when they are retracted.

6. In a machine for shaping a tire casing, said machine having shaft means and two pairs of relatively slideable members slideably supported upon said shaft means for symmetrical and uniform movement toward and away from a central plane passing perpendicularly through said shaft means midway between said pairs of slide means and having actuating means for effecting said relative movements of said pairs of said slide means, the improvement comprising:

plural groups of three rigid, interconnected elements arranged around said shaft means to define a substantially annular surface, two of said elements in each group being substantially identical and pivotally supported upon and connected to both slide means in each pair thereof for effecting pivotal movement of said slide elements from positions extending substantially radially from said shaft means and positions substantially parallel with said shaft means, and one central element in each group being pivotally mounted upon and extending between the other ends of said side elements;

each central element having a pair of aligned and spaced slots equidistant from and on opposite sides of said central plane, said slots being parallel with the axis of said shaft means, and each of said side elements having roller means mounted thereon for reception into one of said slots, said roller means abutting the remote ends of said slots when and somewhat before the groups of elements reach their fully extended positions and said rollers abutting the adjacent ends of said slots during the major part of the retracting movement of said slide elements;

said actuating means effecting symmetrical movement of said side elements between their extended and retracted positions so that said central elements are substantially bisected by said central plane substantially throughout the radial movement thereof; and a resiliently flexible, annular cover means encircling said groups of elements and tightly secured along the axial edges thereof to said pairs of slide means, and the central annular portion of said cover means being positioned closely adjacent to and substantially resting on said central elements when said groups of elements are in the retratced positions whereby movement of said groups of elements to the extended positions by said actuating means causes said central elements to contact the central annular portion of said cover means and expand same radially outwardly into a substantially U shape in partial surrounding relationship to said groups of elements.

7. A machine for shaping a tire casing, comprising:

elongated slide support means;

first and second pairs of relatively movable slide means supported on said slide support means for movement toward and away from each other and with respect to said slide support means;

a plurality of rigid elements arranged in groups of three elements defining an annular surface extending substantially concentrically around said elongated slide support means, each group of elements including a pair of similar side elements pivotally connected near one end of each to each of the slide means in each pair of slide means, and a central element pivotally mounted upon and extending between said side elements;

each central element having a pair of aligned slots disposed on opposite sides of a central plane constantly disposed midway between said pairs of slide means, said slots extending transversely of said central plane, and each side element supporting near its other end roller means disposed within a said slot;

actuating means adapted to effect said movement of said slide means with respect to said support means, whereby said elements in each group are simultaneously moved between substantially aligned and retracted positions and extended positions substantially defining a U shape;

a resiliently flexible and annular cover means encircling said groups of elements, the opposite axial edges of said cover means being secured to said pairs of said slide means, and the central annular portion of said cover means being positioned closely adjacent to and substantially resting on said central elements when said groups of elements are in the retracted positions whereby movement of said groups of elements to the extended positions by said actuating means causes said central elements to contact the central annular portion of said cover means and expand same radially outwardly into a substantially U shape in partial surrounding relationship to said groups of elements; and each of said elements in said groups having flange means along its radially outer surface engageable with said resiliently flexible cover means to define a substantially solid surface when said groups are in said extended positions.

References Cited

UNITED STATES PATENTS 3,433,695   3/1969   Caretta et al. _____ 156—416X

BENJAMIN A. BORCHELT, Primary Examiner

S. C. BENTLEY, Assistant Examiner

U.S. Cl. X.R.

156—416; 419